United States Patent [19]

Chilton et al.

[11] Patent Number: 4,738,395

[45] Date of Patent: Apr. 19, 1988

[54] FLUID FLOW RATE DETECTOR AND SYSTEM

[75] Inventors: David B. Chilton; George B. Woodin, both of Charlotte, N.C.

[73] Assignee: Hot Water Equipment Corporation, Charlotte, N.C.

[21] Appl. No.: 15,284

[22] Filed: Feb. 17, 1987

[51] Int. Cl.[4] .............................................. F22B 35/00
[52] U.S. Cl. ................................... 236/23; 236/25 A; 116/204; 116/264
[58] Field of Search ...................... 236/25 R, 25 A, 23; 237/19; 126/362; 116/204, 264; 340/606; 307/118; 73/816.47

[56] References Cited

U.S. PATENT DOCUMENTS 2,963,563  12/1960  Patterson .
3,601,310   8/1971  Hein .
4,178,907  12/1979  Sweat, Jr. .
4,313,111   1/1982  Anderson .
4,371,779   2/1983  Maynard et al. .
4,497,434   2/1985  Lawless .......................... 236/25 A
4,513,184   4/1985  Hughes .

Primary Examiner—Henry Bennett
Attorney, Agent, or Firm—Bell, Seltzer, Park & Gibson

[57] ABSTRACT

A fluid flow rate detector for controlling an electric switch in a circuit for regulating fluid flow, the detector including inner and outer portions where fluid is received in the inner portion and flows out into the outer portion through perforations in the inner portion. A magnetic slug is disposed in the inner portion and moves away from a home position in the direction of fluid flow when the flow exceeds a predetermined rate. The slug then is deposited in a zone between the perforations and an end cap of the inner portion so as to permit the flow of fluid to occur at a substantially unimpeded rate. A magnetically activated electric switch responds to the movement of the slug and opens and closes an electric switch in response to the fluid flow rate. The detector can be used in a system dually providing a source of hot water to a hot water sink and to a source of heat.

22 Claims, 1 Drawing Sheet

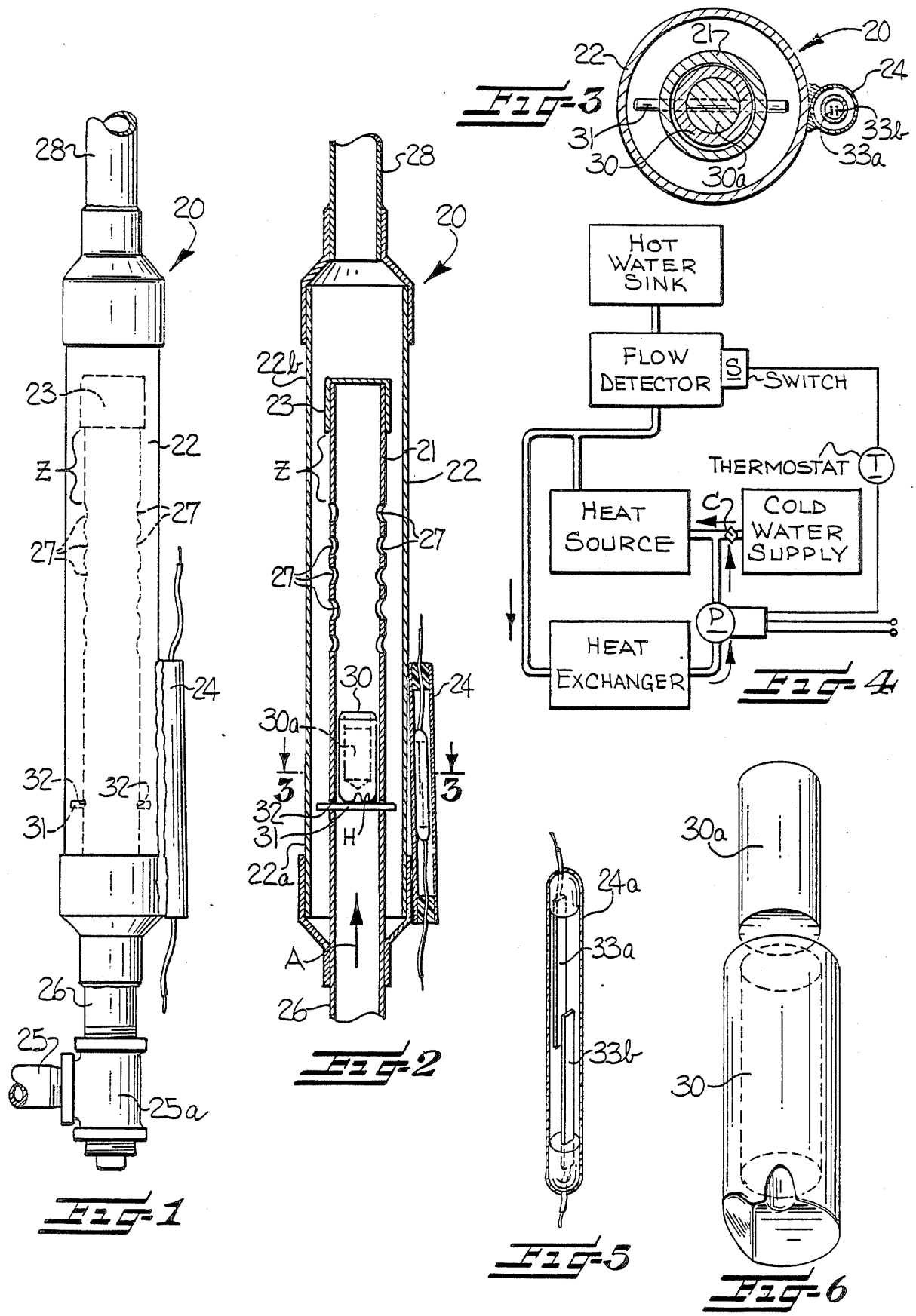

FLUID FLOW RATE DETECTOR AND SYSTEM

FIELD OF THE INVENTION

This invention relates to a novel fluid flow rate detector for controlling an electric circuit which regulates fluid flow or other machines or processes. This invention also relates to the use of a fluid flow rate detector in a system which provides a source of hot water to a water sink and a source of heat.

BACKGROUND OF THE INVENTION

It is often necessary to be able to regulate the flow of a fluid so that when the demand for the fluid is high in one area, the flow to a second area can be reduced or stopped until the high demand ceases. An example of this is use of a single heat source to heat water for domestic household use such as the hot water faucets and showers, and the same hot water source to heat the house, thereby eliminating the waste of energy occurring when separate heat sources are employed. In order to effectively provide hot water for domestic use when there is a simultaneous demand for hot water and for heat, assuming domestic use is of a higher priority, the flow of hot water must be detected and regulated so as to provide sufficient hot water to the faucets, reducing the supply to the source of heat for the house as necessary. The present invention accomplishes this by employing a fluid flow rate detector which controls an electric switch in a circuit which regulates the water flow.

In the past, it has been known to utilize various flow actuated control devices to adjust the flow of fluid. Exemplary devices are illustrated in U.S. Pat. No. 2,963,563 to Patterson, U S. Pat. No. 4,313,111 to Anderson and U.S. Pat. No. 4,513,184 to Hughes. However, these systems suffer from the limitation that the flow of fluid is substantially impeded when the fluid is passing through the control device.

With respect to systems providing a source of hot water and a source of heat from a single source, an exemplary system is shown in U.S. Pat. No. 4,178,907 to Sweat, Jr. However, the system does not utilize a fluid flow rate detection device to regulate the flow of fluid to the hot water faucets or sinks and to the air heating system.

It is, therefore, an object of the present invention to provide a fluid flow rate detector for controlling an electric switch in a circuit for regulating fluid flow.

It is a still further object of the invention to provide a heating system providing a source of hot water to a water sink and to a source of heat which utilizes a fluid flow detector for controlling an electric switch of a circuit which regulates fluid flow to the water sink and to the source of heat. These and other objects and advantages of the invention will be particularly identified below.

SUMMARY OF THE INVENTION

A fluid flow detector is necessary in a system where fluid flow is being directed to two or more different areas, and the flow has to be regulated to provide sufficient flow to a specific area during a high demand period. In accordance with the present invention, a fluid flow detector for controlling an electric switch in a circuit for regulating fluid flow is provided. The detector includes inner and outer portions where the fluid is received in the inner portion and flows out into the outer portion through perforations in the inner portion. A magnetic slug is disposed in the inner portion and moves away from a home position in the direction of fluid flow when the flow exceeds a predetermined rate. A magnetically activated electric switch responds to this movement of the slug, and thus opens and closes in response to the fluid flow rate. The inner portion also has an end cap for sealing its end downstream of the perforations. The zone between the end cap and perforations is the place the magnetic slug is deposited when the predetermined rate is exceeded. This permits a substantially unimpeded flow of fluid through the perforations to occur.

The detector is particularly useful in a system providing a source of hot water to a hot water sink and to a source of heat. When a high quantity of hot water is demanded at a sink, the flow of hot water to the source of heat must be reduced for there to be sufficient hot water at that sink.

BRIEF DESCRIPTION OF THE DRAWINGS

FIG. 1 is an overall view of a fluid flow detector.

FIG. 2 is a vertical sectional view of the fluid flow detector.

FIG. 3 is a top sectional view taken along line 3—3 of FIG. 2.

FIG. 4 is a schematic representation of a system providing hot water to a hot water sink and to a heat exchanger.

FIG. 5 is a vertical sectional view of a magnetically activated electric reed switch.

FIG. 6 is an exploded view of a magnetic slug.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, applicants provide these embodiments so that this disclosure will be thorough and complete, and will fully convey the scope of the invention to those skilled in the art.

Referring now to FIGS. 1-3, a fluid flow rate detector embodying the present invention is there illustrated as a tubular construction generally indicated at 20. The detector 20 is comprised of an inner portion 21 and an outer portion 22 coaxial with each other, a magnetic slug 30 disposed within the inner portion 21, cap means 23 sealing the inner portion, and a magnetically activated switch 24 located on the exterior surface of the outer portion 22. Turning now to the specific aspects of the detector 20 and its use in a heating system, the present invention will be discussed in detail hereinafter.

The inner portion 21 and outer portion 22, coaxial with each other as shown in FIG. 3, are made of a non-corroding material such as copper.

The inner portion 21 is a tube of predetermined length having an open lower end 26 and an upper portion with perforations 27 in the tube wall. Between the open lower end and perforations 27, a pair of transverse openings 32 is made on a diameter through both tube walls to receive a pin 31. A cap 23 seals the upper end downstream of the perforations. The upper end rather than having a cap may include a stop or pin. A cap 23 is preferred in that the cap serves to cushion the slug as it comes to a rest. The area between the cap means 23 or the stop and the location of the perforations 27 define a zone Z where, when the fluid flow rate is sufficient, a magnetic slug 30 is deposited. This permits the fluid to flow out of the perforations 27 into the outer portion 22 at a substantially full flow capacity.

The outer portion 22 is a tube having a diameter larger than that of the inner portion, and the inner tube is received therein, as illustrated. The lower segment 22a extends over the perforations 27 and transverse openings 32 and forms a fluid tight seal with the outside of the inner tube, to receive and contain all fluid that may flow from the perforations and transverse opening of the inner tube. The outer portion is sufficiently long to encase the inner portion, and it has a diameter large enough so that the annular fluid flow area defined by the outside of the inner portion and inside of the outer portion is at least as large as the area of the inner portion. This minimizes flow restrictions at high fluid flow rates.

The detector is installed in the fluid flow circuit to the household faucets and hot water sinks. The lower end 26 of the inner portion of the detector is connected to a source of fluid 25, so fluid is able to flow into the inner portion. The upper segment 22b of the outer portion of the detector is connected to a tube 28 that leads to the household faucets and sinks. A T-fitting 25a may be installed in line with the inner portion, allowing access to the inner portion for easy cleaning.

A magnetic slug 30 is received in the inner portion 21. The slug 30 is typically made of non-corroding material such as bronze or copper and has a hollow center for placement of a magnetic insert 30a (see FIG. 6). The slug 30 is shaped so as to provide a predetermined fit with the inner portion 21. This predetermined fit defines the flow rate necessary to move the slug 30 within the inner portion 21 in that the slug will not move until a flow rate is obtained that is sufficient enough to force it to move. The slug can also be of a beveled configuration so as to prevent it from rattling and making noise when moving. This is accomplished by shaping a bevel or a notch in the bottom end of the slug. The slug 30 when not moving rests at a home position H defined by a pin 31. The pin 31 is received in the pair of transversely aligned openings 32 provided in the inner portion 21.

A magnetically activated electric switch 24 responds to the movement of the magnetic slug 30. The switch 24 is located on the exterior surface of the outer portion 22 and is preferably proximate to the home position H of the slug 30. An exemplary electric switch is a magnetic reed switch 24a as shown in FIG. 5. The switch has two reeds 33a, 33b which are closed in the presence of a magnetic field, and which open when the magnetic field is removed, as happens with the movement of the slug 30 in the direction of the fluid flow shown by arrow A. Thus, the switch 24 is opened and closed in response to the fluid flow rate through the detector 20. This opening and closing of the switch can be utilized to open an electric circuit to a thermostat T, which controls the demand for fluid flow elsewhere in the system.

In operation, fluid flow is channeled from the fluid source to the inlet 26 of the inner portion 21. The magnetic slug is normally at its home position and the magnetic reed switch is normally closed. As hot water faucets are opened and fluid flow begins, the fluid is directed against the bottom of magnetic slug 30 in the inner portion 21. When the flow reaches a predetermined rate, the slug 30 is moved a distance proportional to the rate of flow away from the home position H in the direction of fluid flow A. This movement of the slug 30 changes the state of the magnetically activated switch 24 which can then be used to control the flow of fluid elsewhere. The detector 20 is typically in a vertical position and the magnetic slug 30 returns by the force of gravity to the home position H when the flow of fluid is less than the predetermined rate.

The fluid flows through the inner portion, exits through the perforations 27 into the outer portion 22, and flows into the tube 28. Fluid escaping the inner portion through the openings 32 is negligible. As the fluid flow rate increases, the magnetic slug if propelled into the zone Z, where it does not impede fluid flow. Thus, while the valve is sensitive to low fluid flow rates, such as one half gallon per minute, it does not impede high fluid flow rates. Moreover, it has only one moving part making it reliable, and no openings for sensors or levers, making it essentially leak proof.

An exemplary system utilizing the detector is shown in FIG. 4. The system depicted provides hot water to household water sinks and provides a source of heat utilizing the hot water to heat the household. It is to be noted that the detector can be used to control a circuit in a plurality of other machines or processes unrelated to the system shown in FIG. 4. Additionally, the detector can employ multiple sensors so that different circuits can be controlled based upon different magnetic slug positions.

In the illustrated system, cold water is supplied to a single heat source, the heated water is supplied to hot water sinks and is circulated to a hot water radiator in the heat exchanger by a pump P, and is then returned to the heat source at a point downstream of a check valve C and cold water supply. The pump in this circuit is activated by a thermostat T, which responds to the temperature in the house. A fan in the heat exchanger blows air over the hot water radiator and circulates the heated air to the house. It is recognized that the detector can be utilized in combination with a plurality of different heating systems and methods such as baseboard heat, fan convectors, radiant slabs, hydronic baseboard heat and the like.

In the illustrated domestic hot water system, the hot water flows under pressure from the cold water supply whenever a faucet is opened. A flow detector of the type disclosed earlier monitors the flow rate from the heat source to the hot water sink. The switch 24 on the flow detector is connected in series with the thermostat, and opens the circuit, disabling the thermostat and pump, when the flow rate to the hot water sinks exceeds a predetermined rate.

Such a system eliminates the need to have separate heat sources for both hot water and household heat, and thereby reduces the amount of energy (and money) expended by the household. The limitation in the system is that when there is a high demand for hot water for domestic use, the hot water flow to the heating unit is temporarily interrupted. This is done on the basis that domestic use for showers, dish washers, clothes washers, cooking, etc. is usually sporadic and short term. Also, it is usually a great inconvenience to have this interrupted. On the other hand, the demand for household heat is usually greatest at night, when domestic water use is lower. Moreover, the heat loss rate in a house is usually very low due to the heat retained by the furniture, walls, etc., and a brief interruption in the heat supply is not noticed.

It will be seen that the invention provides a low fluid flow rate detector for controlling an electric switch in a circuit for regulating fluid flow, yet also permits fluid to flow substantially unimpeded at high flow rates. The subject fluid flow rate detector can also be utilized to control electric switches in many other machines and processes. The detector is particularly useful in a system providing a source of hot water to a hot water sink and to a source of heat.

The foregoing embodiments are to be considered illustrative rather than restrictive of the invention, and those modifications which come within the meaning and range of equivalents of the claims are to be included therein.

What is claimed is:

1. A fluid flow rate detector for controlling an electric switch in a circuit for regulating fluid flow, said detector comprising:

an inner portion defining an inlet for receiving fluid flow from a fluid source and perforations downstream from the inlet for allowing the received fluid to flow out of the inner portion;

an outer portion coaxial with said inner portion and defining an inlet for receiving the fluid flowing out of the perforations of the inner portion and an outlet for connection to a fluid sink downstream of the outer portion inlet, the outer portion inlet forming a fluid tight seal with the inner portion;

magnetic slug means disposed within the inner portion for moving in the direction of fluid flow from a home position when the fluid flow exceeds a predetermined rate and for returning to a home position when the fluid flow is less than a predetermined rate;

cap means for sealing the end of the inner portion downstream of the perforations and defining a zone between the perforations and the cap means, where when the predetermined rate is sufficient, the magnetic slug is deposited in the zone and fluid flow from the inner tube portion to an outer portion is permitted to occur at a substantially unimpeded full flow capacity; and a magnetically activated electric switch responding to the movement of the slug, so that the electric switch is opened and closed in response to the fluid flow rate through the fluid flow rate detector.

2. A fluid flow rate detector according to claim 1 wherein said detector is employed in a heating system which provides a source of hot water for a hot water sink and for a source of heat.

3. A fluid flow rate detector according to claim 1 wherein said inlet for receiving fluid flow from a fluid source is proximate to one end of the inner portion and said perforations are proximate to the end opposite of the inlet.

4. A fluid flow rate detector according to claim 1 wherein said inner portion includes a pair of opposing transversely aligned openings therein, proximate to the inlet end of the inner portion and adapted for receiving a pin, said apertures and pin defining the home position of the magnetic slug.

5. A fluid flow rate detector according to claim 1 wherein said magnetic slug is of a configuration providing a predetermined fit with the inner portion to define the flow rate at which the magnetically activated electric switch opens and closes.

6. A fluid flow rate detector according to claim 1 wherein said magnetic slug is of a beveled configuration so as to prevent said slug from rattling and making noise during movement.

7. A fluid flow rate detector according to claim 1 wherein said inner portion and outer portion are situated in a vertical position and the magnetic slug returns by the force of gravity to the home position away from the end cap, when the fluid flow is less than the predetermined rate.

8. A fluid flow rate detector according to claim 1 wherein said magnetically activated electric switch is a magnetic reed switch which responds to the movement of the magnetic slug by opening the contact between the reeds thereby opening an electrical circuit to the thermostat.

9. A fluid flow rate detector according to claim 1 wherein said inner portion further defines an access port coaxial with the inner portion to facilitate cleaning said detector.

10. A fluid flow rate detector according to claim 1 wherein said magnetically activated electric switch is attached to the exterior surface of the detector and is proximate to the home position.

11. A fluid flow rate detector according to claim 1 wherein said magnetically activated electric switch is in series with a thermostat.

12. A heating system providing a source of hot water to a water sink and to a source of heat, said system comprising:

(a) means for receiving cold water and converting it to hot water;
   (b) a heat exchanger including a hot water coil for converting the heat in the water to a source of heat;
   (c) means for directing a flow of hot water to the heat exchanger in response to a demand for heat signal;
   (d) means for directing a flow of hot water to a hot water sink;
   (e) a flow rate detector for monitoring the flow to the hot water sink, said detector comprises an inner portion defining an inlet for receiving the hot water flow from a source and perforations downstream from the inlet for allowing the received hot water to flow out of the inner portion, an outer portion coaxial with said outer portion and defining an inlet for receiving the hot water flowing out of the perforations of the inner portion, and an outlet downstream of the outer portion inlet for connection to a hot water sink, the outer portion inlet forming a fluid tight seal with the inner portion, a magnetic slug means disposed within the hot water flow in the inner portion for moving in the direction of hot water flow from a home position when the hot water flow exceeds a predetermined rate and for returning to a home position when the hot water flow is less than a predetermined rate and cap means for sealing the end of the inner portion downstream of the perforations and defining a zone between the perforations and the end cap where when the predetermined rate is sufficient, the magnetic slug is deposited in the zone and hot water flow from the inner portion to the outer portion is permitted to occur at a substantially unimpeded full flow capacity; and
   (f) a magnetically activated electric switch in series with the means for directing a flow of hot water to the heat exchanger and responding to the movement of the slug, so that the electric switch is open and closed in response to the hot water flow rate through the flow rate detector and thereby interrupts the demand for heat signal so that hot water flows to only the water sink when the hot water flow demand exceeds the predetermined rate.

13. A heating system according to claim 12 wherein said inner portion is a tube and said outer portion is a second tube coaxial with the inner tube.

14. A heating system according to claim 12 wherein said inlet for receiving flow of hot water from a hot water source is proximate to one end of the inner portion and said perforations are proximate to the end opposite of the inlet.

15. A heating system according to claim 12 wherein said magnetic slug is of a configuration providing a predetermined fit with the inner portion to define the flow rate at which the magnetically activated electric switch opens and closes.

16. A fluid flow rate detector according to claim 12 wherein said magnetic slug is of a beveled configuration so as to prevent said slug from rattling and making noise during movement.

17. A heating system according to claim 12 wherein said inner portion and outer portion are situated in a vertical position and the magnetic slug returns by the force of gravity to the home position away from the end cap, when the water flow is less than the predetermined rate.

18. A heating system according to claim 12 wherein said magnetically activated electric switch is a magnetic reed switch which responds to the movement of the magnetic slug by opening the contact between the reeds thereby opening an electrical circuit to the thermostat.

19. A method for controlling an electric switch in a circuit in response to the rate of flow of a fluid, the method comprising the steps of
channeling the fluid flow through an inner portion of a flow rate detector and directing the fluid flow against a movable magnetic slug disposed within the inner portion,
moving the magnetic slug a predetermined distance from its home position in response to the impact of the fluid flow through the inner portion, the distance of movement of the magnetic slug being proportional to the rate of flow of the fluid;
changing the state of a magnetically activated electric switch in response to the movement of the magnetic slug a predetermined distance;
exiting the fluid flow from the inner portion to an outer portion coaxial with the inner portion by moving the magnetic slug to a zone of the inner portion that is substantially removed from the fluid flow path thereby permitting substantially unimpeded full flow capacity by exiting the fluid from the inner portion downstream of the zone; and
cutting off the flow of fluid to a heat supply when the state of said magnetically activated electric switch is changed in response to the movement of the magnetic slug a predetermined distance.

20. A method according to claim 19 wherein said step of exiting the fluid flow comprises moving the magnetic slug to a zone of the inner portion that is substantially removed from the fluid flow path by exiting the fluid from the inner portion downstream of the zone.

21. A method according to claim 19 which includes the additional step of cutting off the flow of fluid to a heat supply when the state of said magnetically activated electric switch is changed in response to the movement of the magnetic slug a predetermined distance.

22. A method for providing a source of hot water to a water sink and to a source of heat, the method comprising the steps of
converting cold water to hot water;
channeling the hot water flow through an inner tube portion of a flow rate detector and directing the hot flow against a movable magnetic slug disposed within the inner tube portion,
moving the magnetic slug a predetermined distance from its home position in response to the impact of the hot water flow through the inner tube portion, the distance of movement of the magnetic slug being proportional to the rate of flow of the hot water;
changing the state of a magnetically activated electric switch in response to the movement of the magnetic slug a predetermined distance;
exiting the hot water flow from the inner tube portion to an outer tube portion coaxial with the inner tube portion at a substantially unimpeded full flow capacity when the magnetic slug has moved another predetermined distance; and
interrupting the demand for heat signal so that hot water flows only to the water sink when the rate of hot water flow exceeds a predetermined rate.

* * * * *